US012775993B2

(12) United States Patent
Dettorre et al.

(10) Patent No.: US 12,775,993 B2
(45) Date of Patent: Oct. 27, 2026

(54) SYSTEM AND METHOD FOR ACQUIRING AND DETERMINING AXES OF VALVES IN TIRE VULCANIZATION MOLDS

(71) Applicant: COMPAGNIE GENERALE DES ETABLISSEMENTS MICHELIN, Clermont-Ferrand (FR)

(72) Inventors: Jean-Marie Dettorre, Clermont-Ferrand (FR); Nicolas Bard, Clermont-Ferrand (FR); Mohamed-Abbas Konate, Clermont-Ferrand (FR); Pierre Bouges, Clermont-Ferrand (FR); Romain Calvel, Clermont-Ferrand (FR)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/993,038

(22) PCT Filed: Jul. 5, 2023

(86) PCT No.: PCT/EP2023/068606
§ 371 (c)(1),
(2) Date: Jan. 10, 2025

(87) PCT Pub. No.: WO2024/012960
PCT Pub. Date: Jan. 18, 2024

(65) Prior Publication Data

US 2026/0004378 A1 Jan. 1, 2026

(30) Foreign Application Priority Data

Jul. 13, 2022 (FR) ...................................... 2207219

(51) Int. Cl.
*G06T 1/00* (2006.01)
*B29D 30/06* (2006.01)
(Continued)

(52) U.S. Cl.
CPC ........ *G06T 1/0014* (2013.01); *B29D 30/0606* (2013.01); *G06T 7/001* (2013.01);
(Continued)

(58) Field of Classification Search
CPC ......... G06T 1/0014; G06T 7/001; G06T 7/62; G06T 7/74; G06T 2207/10024;
(Continued)

(56) References Cited

U.S. PATENT DOCUMENTS 7,481,642 B2 1/2009 Niewels
7,762,122 B2 7/2010 Advani et al.
(Continued)

FOREIGN PATENT DOCUMENTS

CA 2190720 A1 5/1997
CN 110793968 A * 2/2020 ......... G01N 21/8806
(Continued)

OTHER PUBLICATIONS

International Search Report dated Sep. 26, 2023, in corresponding PCT/EP2023/068606 (4 pages).
(Continued)

*Primary Examiner* — Michael Lee
(74) *Attorney, Agent, or Firm* — VENABLE LLP

(57) ABSTRACT

A system (100) implements a method for identifying vents (150) in a tire vulcanization mold (10) comprising one or more segments (10A) and an inner surface (10*a*) over which the vents are dispersed in order to allow corresponding valves (200) to be inserted therein. A method also implements the disclosed system (100).

10 Claims, 4 Drawing Sheets

(51) Int. Cl.

| | |
|---|---|
| ***G06T 7/00*** | (2017.01) |
| ***G06T 7/62*** | (2017.01) |
| ***G06T 7/73*** | (2017.01) |
| ***G06V 10/26*** | (2022.01) |
| ***G06V 10/44*** | (2022.01) |
| ***G06V 10/764*** | (2022.01) |
| ***G06V 10/82*** | (2022.01) |
| ***H04N 23/61*** | (2023.01) |

(52) U.S. Cl.

CPC .................. *G06T 7/62* (2017.01); *G06T 7/74* (2017.01); *G06V 10/26* (2022.01); *G06V 10/44* (2022.01); *G06V 10/764* (2022.01); *G06V 10/82* (2022.01); *H04N 23/61* (2023.01); *B29D 2030/0617* (2013.01); *G06T 2207/10024* (2013.01); *G06T 2207/10028* (2013.01); *G06T 2207/20084* (2013.01); *G06T 2207/30164* (2013.01); *G06V 2201/06* (2022.01)

(58) Field of Classification Search

CPC . G06T 2207/10028; G06T 2207/20084; G06T 2207/30164; B29D 30/0606; B29D 2030/0617; G06V 10/26; G06V 10/44; G06V 10/764; G06V 10/82; G06V 2201/06; H04N 23/61

See application file for complete search history.

(56) References Cited

U.S. PATENT DOCUMENTS

| | | | | |
|---|---|---|---|---|
| 10,239,270 | B2 | 3/2019 | Massoptier-David et al. | |
| 10,442,117 | B2 * | 10/2019 | Singh ................ | G01B 11/2518 |
| 12,157,253 | B2 | 12/2024 | Takahashi | |
| 2005/0236726 | A1 | 10/2005 | Niewels | |
| 2007/0246851 | A1 | 10/2007 | Niewels | |
| 2009/0098232 | A1 | 4/2009 | Niewels | |
| 2009/0273107 | A1 | 11/2009 | Advani et al. | |
| 2023/0127517 | A1 | 4/2023 | Takahashi | |

FOREIGN PATENT DOCUMENTS

| | | | | |
|---|---|---|---|---|
| DE | 102010060901 | A1 | 5/2012 | |
| EP | 0774333 | A2 | 5/1997 | |
| KR | 10-0845093 | B1 | 7/2008 | |
| WO | 2005/102660 | A1 | 11/2005 | |
| WO | WO-2020213652 | A1 * | 10/2020 | ............ B29C 35/02 |
| WO | 2021/176943 | A1 | 9/2021 | |

OTHER PUBLICATIONS

Copending U.S. Appl. No. 19/124,622, filed Oct. 26, 2023 (available on USPTO system).

* cited by examiner

[Fig. 1]
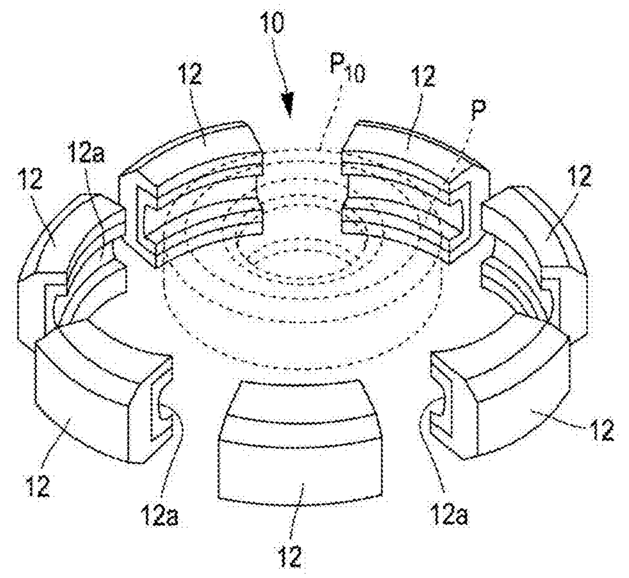
[Fig. 2]
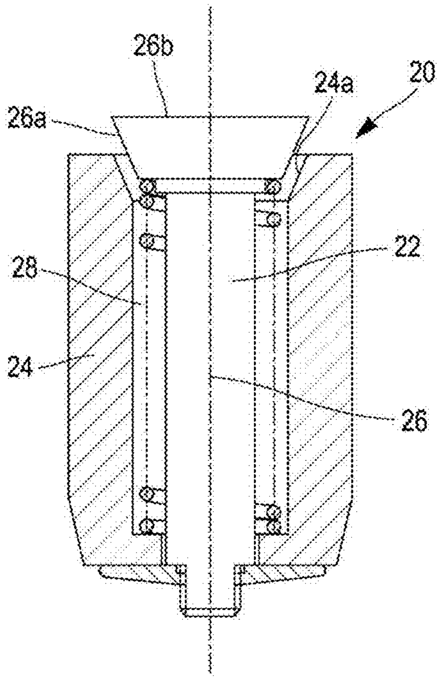

[Fig. 3]
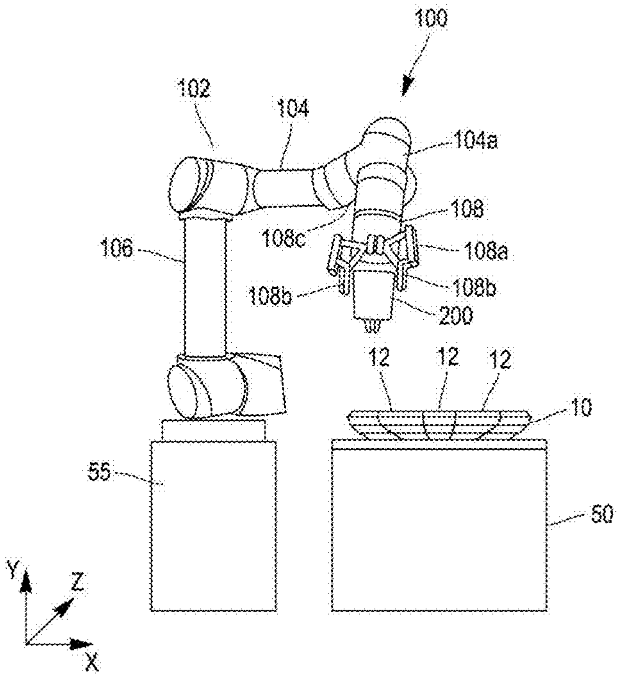
[Fig. 4]
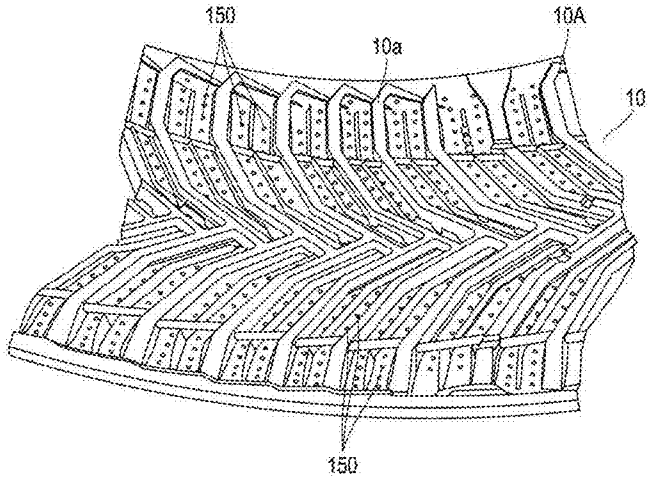

[Fig. 5]
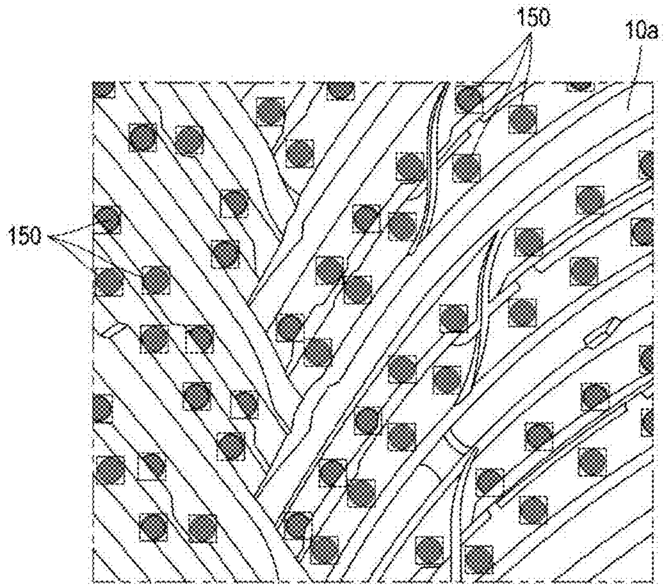
[Fig. 6]
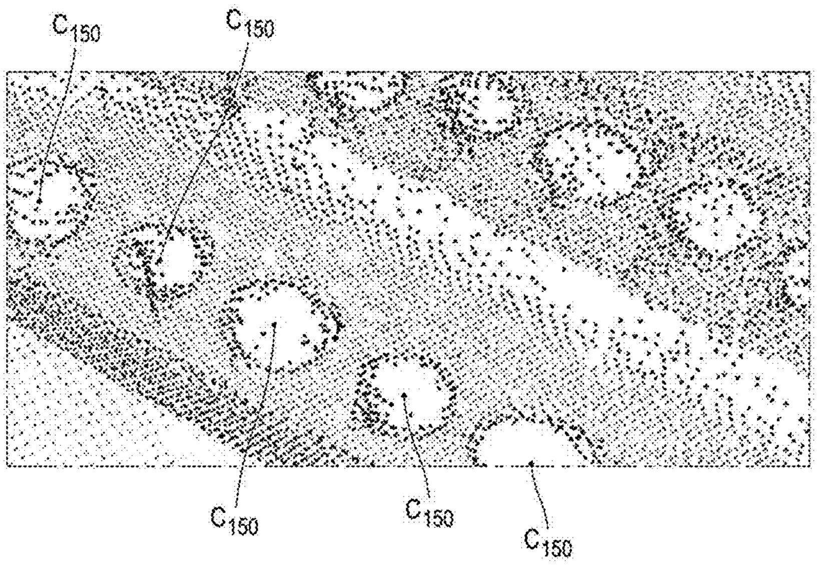
[Fig. 7]
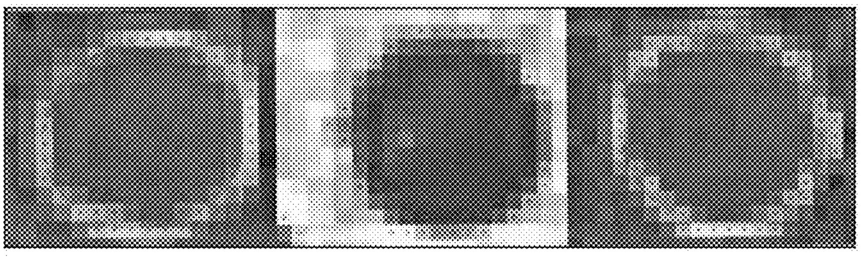

[Fig. 8]
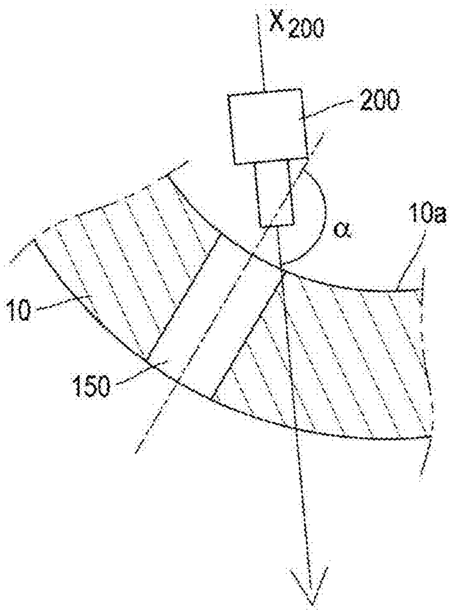
[Fig. 9]
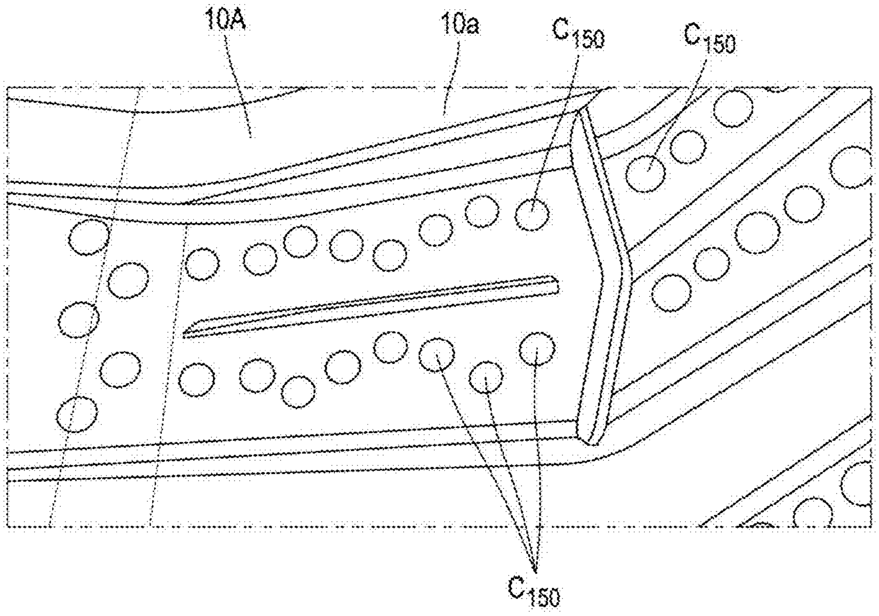

SYSTEM AND METHOD FOR ACQUIRING AND DETERMINING AXES OF VALVES IN TIRE VULCANIZATION MOLDS

TECHNICAL FIELD

The invention relates to a system and method for inserting valves into segments of a curing mould for tyres. More specifically, the invention relates to a system and method for identifying vents in a vulcanization mould for tyres, the vents of which are dispersed to allow corresponding valves to be inserted therein.

CONTEXT

In the field of tyres, segment-type vulcanization moulds are known. With reference to FIG. 1, this type of mould is represented by a mould 10 mainly comprising two shells (not shown) that each mould one of the sidewalls of a tyre P, as well as a plurality of segments 12 that mould the tread $P_{10}$ of the tyre P along the inner surfaces 12*a* of the segments. The segments 12 are radially movable between an open position (shown in FIG. 1) and a closed position of the mould 10. This type of mould can further comprise at least one clamping ring (not shown) to allow radial movement of the segments. An example of this type of mould is disclosed by patent U.S. Pat. No. 10,239,270 of the Applicant.

Manufacturing tyres using this type of mould requires applying a pressure to the green tyre in order to press it against the inner surfaces of the mould at the same time as heat is applied to the mould (for example by electrical induction and/or by magnetic induction, or by means of a heat-transfer fluid, such as pressurized water vapor). For this reason, this type of mould must be ventilated so that the green tyre inflates against the inner surfaces of the segments of the mould.

It is therefore also known that this type of mould comprises a plurality of ventilation holes (or "vents") in order to allow this ventilation during the vulcanization cycles. For example, a typical segment mould can include between 4,000 and 12,000 substantially cylindrical vents distributed along each segment of the mould. Each of the vents includes a valve 20 of the type shown in FIG. 2 by way of example (see patent EP774333B1, for example). The valve 20 comprises a movable insert 22 that ascends and descends in a substantially cylindrical housing 24. The movable insert 22 comprises a valve stem 26 with a frustoconical section 26*a* toward an inner cavity 28 (see FIG. 2) and a flat surface 26*b* toward the surface of the tyre. The conical section 26*a* mates with a seating surface 24*a* of the housing 24 such that, during a vulcanization cycle, the valve is closed by the surface of the approaching green tyre, and, when the tyre is extracted, the valve re-opens after vulcanization. A lining (not shown) can be disposed between the conical section 26*a* and the seating surface 24*a* in a manner that is understood by a person skilled in the art.

The valves are in the form of small tubular and rigid mechanical parts (for example with a diameter of around 2.5 mm and a length of 5 to 12 mm). In addition, their installation in the mould involves force fitting in perforated vents with a diameter that guarantees the adjustment and the resistance of the valves throughout the lifetime of the mould.

The installation operation requires:

locating the vent in order to insert the valve;

gripping the valve in the right direction;

positioning the valve in the vent;

generating the required force so that it enters the adjustment; and applying pressure until the valve is flush.

The valves are individually placed in the segments of the mould (either by a human operator or by a mechanical operator such as a robot). This operation is generally carried out using a tweezer type tool that grips the valve and precisely inserts it into the corresponding vent of the mould. The valve is then hammered into the vent by means of a hammer and a chuck. This type of insertion requires a great deal of effort and takes a great deal of time. Each insertion represents several seconds of work, resulting in a repetitive, tedious task, which, for a human operator, is not very interesting. This results in risks involving weariness and forgetting the valves, undermining the correct operation of the mould.

In order to overcome this problem, devices exist in the prior art for inserting valves into the moulds. For example, German publication DE102010060901 discloses a tool comprising a tubular guide system in which a valve is disposed. The tubular system is placed in line with the vent where, by means of a force in the axis of the valve, a piston pushes the valve in order to press it in a guided and regulated manner. The piston rises by means of a spring, and a new valve engages in the tubular system. Automation is therefore involved in positioning the vents in line, but the valves must be precisely positioned so that they find their reference marks.

Korean patent KR100845093B discloses a system for assembling valves incorporating a machine for manufacturing valves in two parts: a body in which the spring is installed and the valve in itself. The machine is able to be redirected in order to act as a base for a system for fitting valves in order to insert the valves into the vents. However, it lacks the ability to adapt to any mould shape and also to move in order to position the valves in segments.

Indeed, the perforations that create the vents are not always produced as indicated on the drawings, and variations exist due to the manufacturing method generating deviations (for example, vents are added, or moulds are modified by hand). Since precise knowledge of the position of the vents and/or of their axes is not absolutely guaranteed, it is desirable for a system to be developed that knows how to do without this information, as would be the case for a human operator who detects and analyses the situation themselves.

Thus, the disclosed invention uses knowledge of the mould segment in order to repeatedly insert valves. The valve is inserted with a force that can reach up to around 70 kg, which involves properly managing the trajectory of a robot in order to avoid damaging the mould.

To this end, the disclosed invention uses the coordinates of the vents and the detection of their centres and their normals in order to provide a robot with the correct approach and thrust trajectory to facilitate the installation of the valves.

SUMMARY OF THE INVENTION

The invention relates to a system implementing a method for identifying vents in a tyre vulcanization mould comprising one or more segments and an inner surface over which the vents are dispersed in order to allow corresponding valves to be inserted therein, characterized in that the system comprises:

- a robot incorporating a detection system with one or more sensors that detect the presence of one or more vents dispersed along the inner surface of the segment of the mould;
- a communication network that manages the incoming data coming to the system from the detection system; and
- one or more communication servers, each comprising one or more processors operationally connected to a memory configured to store an application for analysing data representing imaged moulds, with the one or more processors comprising a module for executing the analysis application that processes the images and being capable of executing programmed instructions stored in the memory in order to carry out the following steps:
- a step of detecting the presence of an arrangement of vents in the field of view of the detection system, which detection system triggers in order to capture at least one image of the inner surface of the segment of the mould; and
- a step of searching, in the image captured by the detection system, for the presence of the detected vents, such that the detection system continues to capture the images if no vent is detected, until the search for the mould is exhausted.

In some embodiments of the system of the invention, the detection system comprises at least one three-dimensional (3-D) camera of the RGB-D type fixed to the robot that provides 3-D images represented in a set of 3-D points with coordinates (X, Y, Z).

In some embodiments of the system of the invention, the one or more processors are capable of executing programmed instructions stored in the memory in order to carry out the following steps:

- a step of annotating the positions of samples of the vents, with this step comprising a step of creating a coordinate reference of the vents searched for in images captured by the detection system of the system;
- a step of reconstructing the segment, comprising a step of constructing an annotated database storing captured images and coordinates of the pixels of the captured images;
- a step of analysing the contours of the vents carried out by the module for executing the analysis application of the system, with this step comprising a step of determining the surface plane by finding the shape closest to a circle that represents the vent being searched for, with this step further comprising a step of determining the vector normal to the determined surface plane in order to find the insertion axis of the valve; and
- a step of determining the diameter of the vent allowing perforation of a valve with the corresponding diameter, during which step each vent is identified by a contour analysed during the step of analysing the contours of the vents, and during which a corresponding centre is identified by a point;
- such that the system receives the coordinates of an identified vent in order to select a valve with the appropriate diameter.

In some embodiments of the system of the invention, the module for executing the analysis application stored in the memory of the system uses annotation software for constructing bounding boxes around the vents appearing on the captured image of the mould.

In some embodiments of the system of the invention, the processor of the system permanently forms at least one neural network that outputs the classification of the coordinates of the vents, such that the captured images reveal the positions of the vents.

In some embodiments of the system of the invention, the at least one neural network is selected from among convolutional neural networks.

In some embodiments of the system of the invention, one or more steps use a neural network of the deformable transformer type.

In some embodiments of the system of the invention, the robot comprises a peripheral gripping component supported by a pivotable elongate arm, with the peripheral gripping component extending from the elongate arm to a free end where a gripper is disposed along a common longitudinal axis.

In some embodiments of the system of the invention, the gripper comprises a pivotable clamp incorporating gripping fingers that extend from a platform where the clamp is fixed to the free end of the peripheral gripping component, with each finger comprising a member with a predetermined length that extends between an actuation end, where the movement of the finger occurs, and an opposite gripping end, where the finger grips the valve.

In some embodiments of the system of the invention, the one or more processors are capable of executing programmed instructions stored in the memory in order to carry out a step of moving the robot so that it can place the valve so that it can be inserted into an identified vent in a segment of the mould.

The invention also relates to a method implemented by the disclosed system for identifying vents in a tyre vulcanization mould comprising one or more segments and an inner surface over which the vents are dispersed in order to allow corresponding valves to be inserted therein, characterized in that the method comprises the following steps:

- a step of positioning the mould in a field of view of a detection system of the system, such that the vents defined along the inner surface of at least one segment are visible, during which step the detection system passes over the mould;
- a step of detecting the presence of an arrangement of vents in the field of view of the detection system, which detection system triggers in order to capture at least one image of the inner surface of the segment of the mould; and
- a step of searching, in the image captured by the detection system, for the presence of the detected vents, such that the detection system continues to capture the images if no vent is detected, until the search for the mould is exhausted.

In some embodiments of the method of the invention, the method further comprises an inspection step carried out after the valves are inserted into the vents of the mould.

In some embodiments of the method of the invention, the method further comprises a last step of positioning the robot in line with an identified vent, in the insertion axis thereof, during which step the robot blows into the valve.

Further aspects of the invention will become apparent from the following detailed description.

BRIEF DESCRIPTION OF THE DRAWINGS

The nature and the various advantages of the invention will become more apparent from reading the following detailed description, in conjunction with the appended drawings, in which the same reference numerals denote identical parts throughout, and in which:

FIG. 1 shows a perspective view of an embodiment of a segment-type vulcanization mould;

FIG. 2 shows an embodiment of a valve inserted into a vent of the mould of FIG. 1;

FIG. 3 shows a schematic view of a system of the invention allowing valves to be inserted into a tyre vulcanization mould;

FIG. 4 shows an inner surface of a segment of a tyre vulcanization mould, the vents of which are identified by the system of FIG. 3;

FIG. 5 shows an example of annotated bounding boxes that are constructed around the vents appearing on an image of a mould captured in a method carried out by the system of the invention;

FIG. 6 shows an example of the points that define vents appearing on an image of a mould captured in a method carried out by the system of the invention;

FIG. 7 shows an example of the extracted points in a method carried out by the system of the invention and forming one or more ellipses;

FIG. 8 shows a normal vector of a vent identified in an image of a mould captured in a method carried out by the system of the invention;

FIG. 9 shows vents identified by contours analysed during a method carried out by the system of the invention.

DETAILED DESCRIPTION

Reference will now be made to the figures, in which the same numerals identify elements that are identical, where FIG. 3 shows a system 100 (or "system") of the invention for inserting valves. The system 100 implements a method of the invention for inserting valves (for example valves of the type shown in FIG. 2) into segments of a tyre vulcanization mould (for example a mould 10 of the type shown in FIG. 1 and having segments 12). The disclosed method incorporates a machine learning method that is based on the data corresponding to the images that are obtained of the mould, with the algorithm that is used analysing the inner surface of the mould for placing and inserting the valve into an identified vent.

With reference to FIG. 3, a mould 10 is positioned on a work table or on an equivalent support 50 so that it can be processed by the system 100. The support 50 can be configured to move in a rotary manner, in an alternative vertical manner and/or in an alternative horizontal manner, thus allowing a variety of moulds to be treated.

With further reference to FIG. 3, in one embodiment of the system 100, the system comprises a robot 102 with a peripheral gripping component 104 supported by a pivotable elongate arm 106. The peripheral gripping component 104 extends from the elongate arm 106 to a free end 104*a* where a gripper 108 is disposed along a common longitudinal axis. The gripper 108 can be fixed to the peripheral gripping component 104 by screwing an adapter to the free end 104*a* of the peripheral gripping component. It is understood that fixing the gripper 108 to the peripheral gripping component 104 can be carried out by one or more known fixing means (including, yet not limited by, welding, bonding and equivalent means).

In one embodiment of the gripper 108, the gripper comprises a pivotable clamp 108*a* incorporating gripping fingers 108*b* (or "fingers") that extend from a platform 108*c* (where the adapter fixes the clamp 108*a* to the free end 104*a* of the peripheral gripping component 104). Each finger 108*b* comprises a member with a predetermined length that extends between an actuation end (where the movement of the finger occurs) and an opposite gripping end (where the finger grips a valve 200 retained by the clamp during the method implemented by the system 100). Each finger 108*b* has an inner gripping surface, which engages the valve 200 when it is inserted into an identified vent, and an opposite outer surface. The fingers 108*b* are disposed so that a predetermined space is defined between the gripping surfaces, allowing the fingers to move along a common axis during the method implemented by the system 100.

Thus, the robot 102 facilitates the gripping of a variety of valves without interrupting the linear movement of the fingers.

The alternating movement of one or more fingers 108*b* can be achieved by one or more known cylinders that are actuated by a pressurized fluid (for example compressed air) originating from a pipe (not shown). Consequently, the movement of each finger 108*b* performs the corresponding linear movement of the fingers between a standby position (where the gripping surfaces remain substantially parallel with the space between them) (not shown) and a gripping position (where the gripping surfaces approach each other in order to engage the valve 200 and to place it in an insertion position relative to an inner surface 10*a* of the mould 10) (see FIG. 3). The one or more cylinders are selected from commercially available cylinders.

During the method implemented by the system 100, the robot 102 can be moved such that the gripper 108 can grip the valve 200 (as described below). By virtue of the fingers 108*b*, the gripper 108 grips in order to hold the valve 200 while the gripper moves between a gripping position (in which the gripper 108 grips a valve selected for insertion into a corresponding identified vent) (see FIG. 3) and an insertion position (in which the gripper 108 places the gripped valve so that it can be inserted into the identified vent) (not shown). In the embodiments of the gripper 108 comprising the gripping fingers 108*b*, the gripping position of the gripper 108 means that the fingers are in their position for gripping the selected valve. In all the embodiments of the robot 102, the robot can be configured to have six degrees of freedom, allowing it to move on the six axes. In all the embodiments, the robot 102 can be disposed on a support 55 that is configured to move in a rotary manner, in an alternative vertical manner and/or in an alternative horizontal manner, thus allowing a variety of moulds to be treated.

The robot 102 is moved in order to place the valve 200 so that it can be inserted into a vent identified in a segment 10A of the mould 10. In one embodiment of the system 100, the robot 102 can form part of a roaming robot that can be moved either by integrated movement means (for example one or more integrated motors) or by non-integrated movement means (for example one or more autonomous movable carriages or other equivalent movable means). In another embodiment of the system 100, the robot 102 can be attached to a ceiling, a floor, a wall, or to any support that allows the method implemented by the system 100 to be carried out (see, for example, the support 55 of FIG. 3). It is understood that such a robot can be a conventional industrial robot or a collaborative robot or even a delta or cable robot.

The robot 102 includes a detection system that uses one or more sensors (not shown) to detect information concerning the physical environment around the robot. In the following description, the terms "sensor", "photographic equipment", "camera" and "optical sensor" can be used interchangeably and can refer to one or more appliances configured to detect two-dimensional (2-D) and/or three-dimensional (3-D) images, to achieve 3-D depth perception and/or other types of detection of the physical environment around the robot 102. In embodiments of the system 100, the sensors of the detection system incorporated with the robot 102 can be fixed to the elongate arm 106 (for example at the end 104*a*) and/or to the gripper 108 of the robot.

The one or more sensors of the detection system of the robot 102 detect the presence of one or more vents of a mould. By way of example, an inner surface 10*a* of a segment 10A of a vulcanization mould 10 is shown in FIG. 4 (FIG. 4 shows a photograph of the inner surface 10*a* taken with an RGB type camera). A plurality of vents 150 are dispersed along the inner surface 10*a* of the segment 10A, with each vent accommodating a corresponding valve 200. It is understood that each vent is substantially cylindrical and that all the vents 150 have substantially similar diameters.

In some embodiments of the robot 102, the sensor is triggered when a segment of a mould enters the field of view of the camera. In cases where a mould part is not visible in the image obtained by the detection system of the robot 102 (for example the camera of the detection system), an attachment point can be placed at a known position relative to the sensor (for example at a known horizontal distance and at a known vertical distance relative to the position of the sensor).

The detection system can determine information relating to the physical environment around the mould 10 that can be used by a control system of the system 100 (with the control system comprising, for example, software for planning the movements of the robot 102). The control system could be located on the robot 102 or it could be remotely communicating with the robot. In some embodiments of the system 100, one or more 2-D or 3-D sensors mounted on the robot 102 (including, in a non-limiting manner, navigation sensors) can be integrated in order to form a digital model of the physical environment (including, where applicable, the side or sides, the floor and the ceiling). By using the obtained data, the control system can cause the robot 102 to move in order to navigate between the positions for gripping the valves when inserting them into the mould 10.

In one embodiment of the system 100, the detection system comprises at least one camera that provides 3-D images represented as a set of 3-D points with coordinates (X, Y, Z), and sometimes red, green, blue colour values (the "RGB" or "RGB-D" format) (called "an RGB-D type camera"). In this embodiment, an RGB-D type camera is fixed on the robot 102 (for example at the end 104*a* and/or on the gripper 108). Two or more RGB-D cameras can be oriented so that a predetermined overlap is obtained between the fields of view of the cameras. As used herein, the term "camera" includes one or more cameras.

RGB-D cameras generally provide depth information using depth maps, which are images where each pixel contains the distance between the camera and the corresponding point in space. Compared to traditional measurement methods, such as manual measurement and other measurements based on electronic devices, 3-D point cloud data originating from RGB-D type cameras have a much higher measurement rate. Using a sparser structure, a point cloud can be constructed from RGB-D images by computing the real world (for example the coordinates (X, Y, Z)) with the intrinsic data of a digital camera. Thus, information relating to the physical environment around the system 100 is obtained from 3-D point cloud data obtained from detection technologies that are capable of precisely and efficiently capturing the 3-D surface geometries of the moulds. These detection technologies could be selected from commercially available devices (selected, for example, from cameras sold under the brand name ZIVID® by ZIVID AS, artificial viewing systems sold by Cognex Corp., and their equivalents).

The term "point cloud" (in the singular or the plural) is used herein to refer to one or more collections of data points in space. One or more cameras (or one or more equivalent appliances) can gather three-dimensional (3-D) data and detect the surfaces of the objects (for example a segment 10A of a mould 10) by virtue of a series of coordinates. Storing the information in the form of a collection of spatial coordinates can allow space to be saved, since many objects do not fill a large part of the environment. Even if the information is not visual, interpreting the data as a point cloud helps to understand the relationship between a plurality of variables by means of classification and segmentation.

It is understood that one or more cameras can include one or more programming modes, including a learning mode, in order to supply, modify and train at least one neural network. The detection system of the robot 102 detects the presence of an arrangement of vents 150 in the field of view of the detection system (for example the field of view of a camera of the system 100), which triggers the detection system to capture the image of an inner surface 10*a* of the segment 10A of a mould 10 (see FIG. 4). In all the embodiments of the system 100, the system "searches" the image obtained by the detection system for the presence of the vents "seen" by the robot 102. If no vent is detected, the detection system continues to obtain the images until the search of the mould 10 is exhausted. The points of the perimeter of each detected vent are extracted in order to determine the centre thereof in preparation for the insertion of a corresponding valve.

The detection system of the system 100 can comprise a telemeter means that is used in the working space of the mould 10 in order to deduce its dimensions therefrom. In this embodiment, the telemeter means comprises a scanner (not shown) for scanning the entire inner surface 10*a* of the mould 10 in real-time in the physical environment around the mould. Such a scanner allows precise generation of the mould. The scanner can be provided together with a viewing system (not shown) configured to precisely locate the vents in a real-time scenario based on the 3-D profile generated by the scanner.

The viewing system can receive a CAD file from the mould 10 to match the site of a vent from the CAD file with the vent identified in real-time in order to precisely locate and determine its coordinates. The viewing system can receive the CAD file using data transmission methods that are known to a person skilled in the art. The viewing system can further comprise at least one camera and at least one sensor (not shown) for determining the site (i.e., the coordinates) of the vents based on the data gathered in real-time and/or on the contour profile generated by the scanner.

In order to implement the method of the invention by means of a computer, the system 100 comprises a communication network (or "network") that manages the incoming data coming to the system from various sources (for example from at least one robot 102 and the associated detection system). The communication network incorporates one or more communication servers (or "servers"), each comprising one or more processors operationally connected to a memory. The memory is configured to store an application for analysing data representing imaged moulds (and segments of moulds). The one or more processors comprise a module for executing the analysis application that processes the images, with the one or more processors being capable of executing programmed instructions stored in the memory so as to carry out the steps of the method (as described below).

The term "processor" (or alternatively the term "programmable logic circuit") denotes one or more devices capable of processing and analysing data and comprising one or more software packages for processing them (for example one or more integrated circuits known to a person skilled in the art as being included in a computer, one or more controllers, one or more microcontrollers, one or more microcomputers, one or more programmable logic controllers (or "PLCs"), one or more application-specific integrated circuits, one or more neural networks, and/or one or more other known equivalent programmable circuits). The processor comprises one or more software packages for processing the data captured by the detection system of the system 100 (and the corresponding obtained data), as well as one or more software packages for identifying and locating variances and for identifying their sources in order to correct them.

In the system 100, the memory can comprise both volatile and non-volatile memory devices. The non-volatile memory can comprise solid-state memories, such as the NAND flash memory, the "keep-alive" memory (or "KAM") for saving various operating variables while the processor is switched off, magnetic and optical storage media, or any other suitable data storage device that retains the data when the system 100 is deactivated or has lost its power supply. The volatile memory can comprise a static and dynamic RAM that stores program instructions and data, including a learning application.

With further reference to FIGS. 1 to 4 and also to FIGS. 5 to 9, a detailed description is provided, by way of example, of embodiments of a method (or "method") of the invention that is implemented by the system 100. It is clearly understood that the system 100 can implement the method of the invention in any physical environment without prior knowledge of the configuration of the mould.

As used herein, the term "method" or "process" can include one or more steps carried out by at least one computer system comprising one or more processors for executing instructions that allow the steps to be carried out. Unless indicated otherwise, any sequence of steps is provided by way of example, and does not limit the described methods to any particular sequence.

In the following description, embodiments of the method of the invention are described for which the precision of the information obtained by the detection system (for example the camera) differs.

By carrying out the method of the invention, the system 100 incorporates a combination of vision and machine learning techniques in order to correctly and quickly reconstruct the observed scene based on three-dimensional (or "3-D") dispersed point clouds originating from a view of the segment 10A of the mould 10. The system 100 thus implements continuous improvement in terms of the recognition of the vents and their relative distribution along the inner surface 10*a* of the mould 10.

By starting an embodiment of the method of the invention, the method comprises a step of positioning the mould 10 in the field of view of the detection system of the robot 102 (for example positioning the mould on the support 50 as shown in FIG. 3). The mould 10 is positioned such that the vents 150 defined along the inner surface 10*a* of at least one segment 10A are visible in the detection field of the sensor (see FIG. 4). During this step, the robot 102 (and particularly the integrated detection system) passes over the mould 10.

The method further comprises a step of annotating the positions of samples of the vents that is dedicated to learning. During this step, a reference is created of the coordinates of the vents that are sought in images captured by the detection system of the robot 102 (for example an RGB type camera). The coordinate reference of the vents that is created during this step includes expected images corresponding to the vents 150 distributed along the inner surface 10*a* of the mould 10. This step can be carried out before other steps of the method of the invention in order to supply a neural network with the actual coordinates of the vents and their relative positions with respect to one another. In this embodiment of the method, at least part of the reference of the vents can be created by one or more persons skilled in the art.

In embodiments of the method, during this step, a neural network can be trained in order to recognize the actual coordinates of the vents and to create bounding boxes (or "boxed regions") around the recognized vents. During this training, the coordinates of the bounding box of the recognized vent are correlated with the coordinates of the sought-after vents in order to compute any displacements between them. The boxed regions and the displacement computations are transmitted to a neural network (for example one or more CNNs) in order to jointly learn the representation of a vent in various perspectives of the images taken by the detection system of the robot 102.

In this embodiment of the method of the invention, the method further comprises a step of capturing images of the mould 10 (and, more specifically, capturing images of the inner surface 10*a* of the segment 10A of the mould). This step, which is carried out by the robot 102 (and particularly by the associated detection system), comprises a step of scanning the detection system of the robot 102 above the segment 10A of the mould 10. Each image captured during this step is made up of a matrix of pixels where each pixel has a different colour and a luminosity that indicates the position of a vent 150 of the mould 10. The obtained images, revealing one or more positions of the vents 150, drive at least one neural network for identifying all the expected positions of the vents in the imaged mould 10.

Thus, these image variations are used as input for the neural network, which outputs the classification of the coordinates of the vents.

During this step, the aim of the algorithm of the execution module is to automatically identify and indicate the external profile of the vent, as well as the interfaces of the perimeters of the vent (for example its diameter and the angle of its cylindrical axis relative to the curvature of the inner surface 10*a* of the mould 10). During this step, the execution module therefore uses annotation software for constructing bounding boxes around the vents 150 appearing on the image of the mould 10 (see FIG. 7).

The processor of the system 100 permanently forms the neural network based on the newly entered data of the images of the moulds obtained by the detection system of the robot 102. In order to automatically detect the boundaries between the vents and the metal material of the surrounding mould, the robot 102 takes images (which can include videos) and gathers a set of image data from a plurality of moulds of the same type (for example of the type represented by the mould 10 in FIG. 4). Before being recorded, all the image data can be annotated based on the data entered by the operator in order to create the ground-truth data.

For example, in some embodiments, to assist the neural network in detecting and identifying the boundaries of the vent 150 and/or the metal material of the surrounding mould, all the image data is annotated. The known variations are manually identified based on the knowledge of mould professionals.

During this step, the processor of the server can use the ground-truth data to train and/or develop one or more neural networks in order to automatically detect the space for the object (for example the vents 150 of the mould 10). As such, the ground-truth data as described herein generally refers to information provided by the direct observation of the professionals on the ground, as opposed to information that is provided by inference. They can have data available from several sources, including several professionals located in remote locations, in order to develop the neural network. A feedback loop of the annotated images can be updated with additional ground-truth data over time in order to improve the precision of the system 100.

In this embodiment of the method of the invention, the method further comprises a step of reconstructing the segment 10A using three-dimensional digitization with a high degree of resolution. During this step, the bias of a 3-D camera of the detection system is used in the working space of the mould 10 to immediately reconstruct the volume of the segment 10A and to determine its dimensions and to delimit its working area.

This step comprises constructing an annotated database storing the RGB images, the coordinates (X, Y, Z) of the pixels of the obtained images, as well as the coordinates of the bounding boxes. During this step, the purpose of the algorithm of the execution module is to extract the points that define each vent 150 (see FIG. 8). By using the extracted points together with their coordinates (X, Y, Z) and the analysis of the surface over which the vent is defined by these points, it is possible to find the centre $C_{150}$ of each reconstructed vent (see FIG. 8 again) and therefore the normal vector of the surface plane. The orientation of the vent 150 reconstructed relative to the inner surface 10*a* of the mould 10 indicates the corresponding orientation of a valve so that it can be correctly inserted into the mould. Thus, the site of the mould 10 and its limits can be deduced, as well as its geometry (including the tread pattern elements), the inner surface 10*a*, the normals at any point of the mould, the vents 150 used to insert the valves.

In this embodiment of the method of the invention, the method further comprises a step of analysing the contours of each vent 150. In this embodiment of the method of the invention, the 3-D camera of the detection system of the robot 102, by the width of its measurement spectrum, provides better precision by computing the normal on the homogenized plane on the inner surface 10*a* of the mould 10. During this step, each of the extracted points (including the centre $C_{150}$) has corresponding coordinates.

This step comprises a step of determining the surface plane by finding the shape closest to the circle that represents the sought-after vent. Due to the positioning of the vent along the inner surface 10*a* of the mould 10 (having substantially curved portions), it is understood that the extracted points can form one or more ellipses (see the ellipses provided by way of an example in FIG. 9).

This step also comprises a step of determining the vector normal to the surface plane determined during the preceding step. With reference to FIG. 8, a determined normal vector passes the centre $C_{150}$ of the vent 150 in order to find the insertion axis $X_{200}$ of the valve 200 (oriented, for example, at an angle $\alpha$ relative to the inner surface 10*a* of the mould 10). This step will allow the robot 102 to select and orient a valve with an appropriate diameter (for example a valve of the type shown in FIG. 2) to ensure that it is correctly inserted into the corresponding vent.

In this embodiment of the method of the invention, the method further comprises a step of determining the diameter of the vent allowing the perforation of a valve with the corresponding diameter. With reference to FIG. 9, each vent 150 is identified by a contour 150A analysed in the preceding step. The corresponding centre $C_{150}$ is identified by a point. During this step, the purpose of the algorithm of the execution module is to recognize the diameter that as closely as possible corresponds to the diameters of the known vents (known, for example, in the reference of the vents created during the annotation step of this embodiment of the method).

In this embodiment of the method of the invention, the method further comprises a last step of positioning the valve 200 in the identified vent with the corresponding diameter. During this step, the robot 102 receives the coordinates of an identified vent so that the robot can select the valve with the appropriate diameter (for example a valve of the type shown in FIG. 2).

During this step, the robot 102 can select the valve via a tool changer and a valve feed system (both of which are commercially known). During this step, the robot 102 can be positioned in line with the identified vent 150, in the axis of insertion thereof, and can blow into the valve. Once the valve has been pre-positioned by virtue of its shape (either conical or stepped), the robot 102 can press on the valve, either by means of the valve supply head, or by pushing the valve with a dedicated area of an effector deposited at the end 104*a* (not shown).

The use of neural networks provides reliability when determining the vents and above all speed, which avoids long computations. Although the embodiments are described herein with regard to the use of neural networks (and more particularly of convolutional neural networks or "CNNs") by way of a machine learning model, other types of machine learning models can be used. These include, in a non-limiting manner, models using linear regression, logistic regression, decision trees, support vector machines, naive Bayes, K-nearest neighbour (kNN), with K signifying a grouping, random forest, dimensionality reduction algorithms, gradient algorithms, neural networks (for example autoencoders, RNNs, perceptrons, logarithmic short-term memory (LSTM), Hopfield, Boltzmann, deep belief networks, deconvolution, generative adversarial networks (GANs), etc.) and complements and equivalents thereof. The one or more CNNs can be formed using ground-truth data generated using sensor data representing the movement of the robot 102, including the positioning of the gripper 108. One or more steps of this embodiment of the method of the invention use a neural network of the deformable transformer type (or "deformable DETR" or "DETR"). The DETR is used for the end-to-end detection of objects, by combining neural networks of the CNN type and coders-decoders of the "Transformer" type. The DETR initially reduces the computations by only being interested in a small set of key sampling points around a reference (for example the points form the contour 150A around a vent 150 of the mould 10) (see FIG. 9). The DETR then uses a deformable attention module to aggregate multi-scale features in order to facilitate the detection of small objects. Consequently, the DETR can model dependencies between remote objects in the observed scene in order to achieve the ability to detect, to locate and to automatically and precisely classify vents intended for the insertion of the corresponding valves.

In all the embodiments of the method of the invention, the method can further comprise an optional inspection step after the valves 200 are inserted into the vents 150 of the mould 10.

During this step, an operator can carry out an individual manual inspection of everything that is proposed by the robot 102. During this step, a fully automatic inspection can be carried out, involving presence detection and/or a feeler in order to confirm the presence and the correct operation of the valves.

It is understood that all the embodiments of the method of the invention can be carried out in the same factory (for example by a single facility incorporating the system 100).

By using the system 100 of the invention to carry out the disclosed method, any mould presented to the system 100 is analysed in the same way. There is no need to know the CAD file in advance or to have arrangements in the mould so that it can be flawlessly positioned.

The system 100 is natively designed to accommodate variations, which offers, for example, the possibility of working with third-party moulds and/or hand-finished moulds.

The system 100 of the invention can include preprogrammed information relating to expected events. For example, an adjustment of the method of the invention can be associated with the parameters of the typical physical environments in which the system 100 functions (for example the tyre production facilities).

In some embodiments of the invention, the system 100 (or another system incorporating the system 100) can receive audio commands (including voice commands) or other representative audio data (for example a command to start or stop one or more steps of the method of the invention). The request can include a request for the current state of an ongoing method (for example the number of inserted valves relative to the number of vents 150 in the mould 10 provided to receive a corresponding vent). A generated response can be represented in an audible, visual, tactile manner (for example by using a haptic interface) and/or in a virtual and/or augmented manner. This response, together with the corresponding data, can be recorded in a neural network.

It will be understood that the system 100 can include a plurality of computing devices that carry out various aspects of the learning. In these embodiments, the processor can configure the system 100 on one or more parameters of a vent and its known location. In these embodiments, it is understood that one or more reinforcement learning means could be used.

A monitoring system could be implemented for all the embodiments of the system 100. At least part of the monitoring or "alerting" system can be provided in a portable device, such as a mobile network device (for example a mobile telephone, a laptop computer, one or more portable devices connected to the network (including "augmented reality" and/or "virtual reality" devices, wearable clothing connected to the network and/or any combinations and/or any equivalents thereof)). It is conceivable for the detecting and comparing steps to be able to be carried out iteratively.

The terms "at least one" and "one or more" are used interchangeably. The ranges that have been presented as lying "between a and b" include the values "a" and "b".

Although particular embodiments of the disclosed apparatus have been illustrated and described, it will be understood that various changes, additions and modifications can be made without departing from the spirit or the scope of the present disclosure. Consequently, no limitation should be imposed on the scope of the described invention, apart from those disclosed in the appended claims.

The invention claimed is:

1. A system implementing a method for identifying vents in a tire vulcanization mold comprising one or more segments and an inner surface over which the vents are dispersed in order to allow corresponding valves to be inserted therein, the system comprising:

a robot incorporating a detection system with one or more sensors that detect a presence of one or more vents dispersed along the inner surface of the one or more segments of the mold;

a communication network that manages incoming data to the system from the detection system; and one or more communication servers, each comprising one or more processors operationally connected to a memory configured to store an application for analyzing data representing imaged molds, with the one or more processors comprising a module for executing the analysis application that processes the images and being capable of executing programmed instructions stored in the memory in order to carry out the following steps:

a step of detecting a presence of an arrangement of vents in a field of view of the detection system, which detection system triggers in order to capture at least one image of the inner surface of the one or more segments of the mold; and a step of searching, in the image captured by the detection system, for a presence of the detected vents, such that the detection system continues to capture images if no vent is detected, until the search for the mold is exhausted, wherein the detection system comprises at least one three-dimensional camera of the RGB-D type fixed to the robot that provides 3-D images represented in a set of 3-D points with coordinates, and wherein the one or more processors are capable of executing programmed instructions stored in the memory in order to carry out the following steps:

a step of annotating positions of samples of the vents, comprising a step of creating a coordinate reference of the vents searched for in images captured by the detection system of the system;

a step of reconstructing the one or more segments, comprising a step of constructing an annotated database storing captured images and coordinates of pixels of the captured images;

a step of analyzing contours of the vents carried out by the module for executing the analysis application of the system, comprising a step of determining a surface plane by finding a shape closest to a circle that represents the vent being searched for, and further comprising a step of determining a vector normal to the determined surface plane in order to find an insertion axis of the valve; and a step of determining a diameter of the vent allowing perforation of a valve with a corresponding diameter, during which step each vent is identified by a contour analyzed during the step of analyzing the contours of the vents, and during which a corresponding center is identified by a point, wherein the system receives the coordinates of an identified vent in order to select a valve with an appropriate diameter.

2. The system according to claim 1, wherein the module for executing the analysis application stored in the memory of the system uses annotation software for constructing bounding boxes around the vents appearing on the captured image of the mold.

3. The system according to claim 2, wherein the processor of the system permanently forms at least one neural network that outputs classification of the coordinates of the vents such that the captured images reveal the positions of the vents.

4. The system according to claim 3, wherein the at least one neural network is selected from among convolutional neural networks.

5. The system according to claim 4, wherein one or more steps use a neural network of the deformable transformer type.

6. The system according to claim 1, wherein the robot comprises a peripheral gripping component supported by a pivotable elongate arm, with the peripheral gripping component extending from the elongate arm to a free end where a gripper is disposed along a common longitudinal axis.

7. The system according to claim 6, wherein the gripper comprises a pivotable clamp incorporating gripping fingers that extend from a platform where the pivotable clamp is fixed to the free end of the peripheral gripping component, with each finger comprising a member with a predetermined length that extends between an actuation end, where movement of the finger occurs, and an opposite gripping end, where the finger grips the valve.

8. The system according to claim 1, wherein the one or more processors are capable of executing programmed instructions stored in the memory in order to carry out a step of moving the robot so that the robot can place the valve so that it can be inserted into an identified vent in a segment of the mold.

9. A method for identifying vents in a tire vulcanization mold comprising one or more segments and an inner surface over which the vents are dispersed in order to allow corresponding valves to be inserted therein implemented by a system, the system comprising:

a robot incorporating a detection system with one or more sensors that detect a presence of one or more vents dispersed along the inner surface of the one or more segments of the mold;

a communication network that manages incoming data to the system from the detection system; and one or more communication servers, each comprising one or more processors operationally connected to a memory configured to store an application for analyzing data representing imaged molds, with the one or more processors comprising a module for executing the analysis application that processes the images and being capable of executing programmed instructions stored in the memory, and the method comprising the following steps:

a step of positioning the mold in the field of view of the detection system of the system, such that the vents defined along the inner surface of at least one segment are visible, during which step the detection system passes over the mold;

a step of detecting the presence of an arrangement of vents in the field of view of the detection system, which detection system triggers in order to capture at least one image of the inner surface of the one or more segments of the mold;

a step of searching, in the image captured by the detection system, for the presence of the detected vents, such that the detection system continues to capture images if no vent is detected, until the search for the mold is exhausted; and a step of inspecting after the valves are inserted into the vents of the mold.

10. The method according to claim 9, further comprising a last step of positioning the robot in line with an identified vent, in an insertion axis thereof, during which step the robot blows into the valve.

* * * * *